United States Patent

[11] 3,620,984

| [72] | Inventors | Manfred Dahm<br>Leverkusen;<br>Hans Niederprüm, Monheim; Walter<br>Simmler, Cologne-Muelheim, all of<br>Germany |
|---|---|---|
| [21] | Appl. No. | 739,654 |
| [22] | Filed | June 25, 1968 |
| [45] | Patented | Nov. 16, 1971 |
| [73] | Assignee | Farbenfabriken Bayer Aktiengesellschaft<br>Leverkusen, Germany |
| [32] | Priority | June 27, 1967 |
| [33] | | Germany |
| [31] | | F528011V/39b<br>Pat. 1239468 |
| | | Continuation-in-part of application Ser. No.<br>543,524, Apr. 19, 1966, now abandoned.<br>This application June 25, 1968, Ser. No.<br>739,654 |

[54] POLYURETHANE CATALYSTS
19 Claims, No Drawings

[52] U.S. Cl. .................................................. 260/2.5 AC,
252/430 R, 260/2.5 AM, 260/18 N, 260/77.5 AC,
260/448.2 N
[51] Int. Cl. .................................................. C08g 22/44,
C08g 53/08
[50] Field of Search ........................................... 260/2.5
AC, 2.5 AH; 252/430

[56] References Cited
UNITED STATES PATENTS

| 3,170,891 | 2/1965 | Speier ........................ | 260/37 |
| 3,194,773 | 7/1965 | Hostettler ................... | 260/2.5 |
| 3,243,475 | 3/1966 | Reischl et al. .............. | 260/824 |
| 3,278,485 | 10/1966 | Morgan et al. .............. | 260/46.5 |
| 3,397,158 | 8/1968 | Britain et al. ............... | 260/2.5 |
| 3,420,782 | 1/1969 | Dahm et al. ................. | 260/2.5 |

FOREIGN PATENTS

| 1,229,290 | 11/1966 | Germany ...................... | 260/2.5 |
| 1,246,233 | 8/1967 | Germany ...................... | 260/2.5 |
| 1,476,500 | 4/1967 | France ........................ | 260/2.5 |

Primary Examiner—Donald E. Czaja
Assistant Examiner—M. I. Marquis
Attorneys—Clelle W. Upchurch and Gene Harsh ABSTRACT: Polyurethane foams are prepared in the presence of a compound containing the grouping

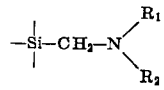

wherein $R_1$ and $R_2$ are the same or different alkyl, cycloalkyl, alkoxyalkyl, alkenyl or aralkyl radicals or are members of a common cycloaliphatic or heterocyclic structure when the silicon atom is part of a silane or lower polysiloxane grouping; or $R_1$ has the above meaning and $R_2$ denotes an hydroxylalkyl or aminoalkyl group attached to the silicon atom through the oxygen or nitrogen atoms respectively. The invention contemplates complexes or mixtures of these compounds with organic metallic compounds also as catalysts. In addition new activator mixtures containing these catalysts are contemplated.

POLYURETHANE CATALYSTS

This application is a continuation-in-part of copending application, Ser. No. 543,524, filed Apr. 19, 1966, now abandoned.

This invention relates to the catalysis of polyurethane reaction mixtures, and more specifically, to novel catalysts for the acceleration of the reactions required for the preparation of cellular polyurethanes.

Cellular polyurethane plastic materials are conventionally prepared by the reaction between a compound containing at least two reactive hydrogen atoms as determined by the Zerewitinoff method and a polyisocyanate. Into this reaction mixture there are generally introduced various additives for blowing the polyurethane, emulsifying the urethane being formed, catalyzing the reactions involved and so on. In the latter category, it has generally been the rule that in order to obtain a proper blowing reaction, a tertiary amine catalyst must be used, while an organometallic compound such as stannous octoate or stannous oleate is employed in order to obtain the proper cross-linking reaction in the preparation of a polyurethane foam. In any event, because the function of each of these two types of catalysts is different, neither of them is mutually exclusive and they are always employed together for good results.

In addition, in the reaction between a polyisocyanate and a compound containing little or no primary hydroxyl functionality such as, for example, in the case of a polyether, especially strong tertiary amine catalysis has been required in addition to the use of the aforementioned organometallic catalysts. Conventionally, triethylene diamine has been used for this purpose since it exerts a very powerful catalytic effect on foam forming polyurethane reactions. Moreover, strong tertiary amines such as triethylene diamine have been considered the best of all the known amines for catalysis of urethane foam forming reactions since they are adaptable to all types of urethane reaction mixtures from the most sluggish polyether to the most active polyester polyisocyanate reactants simply by varying the quantity of the tertiary amine used according to the activity of the reactants.

Although this combination of catalysts has been the best catalyst system available for the production of cellular polyurethanes up to this time, it has been found, surprisingly, a new catalytic system which brings particular advantages as pointed out in the following.

It is therefore an object of this invention to provide a catalyst which accomplishes alone the same desirable results achieved by the prior art combination with additional advantages.

Still another object of this invention is to provide a catalyst for a polyurethane foam reaction mixture which is suitable for use with even the most sluggish reactants.

Yet another object of this invention is to provide a catalyst which exerts a stronger catalytic force on polyurethane foam forming reactants than the conventionally employed triethylene diamine without imparting the odor obtained with the use of such amines.

The foregoing objects and others which will become apparent from the following description are accomplished in accordance with this invention, generally speaking, by providing as a catalyst for polyurethane foam forming reactants a compound containing the grouping

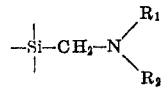

wherein $R_1$ and $R_2$ denote the same or different alkyl, cycloalkyl, alkoxyalkyl, alkenyl and/or aralkyl radicals or are members of a common cycloaliphatic or heterocyclic structure when the silicon atom is part of a silane or lower polysiloxane grouping; or $R_1$ has the above meaning and $R_2$ denotes an hydroxyalkyl or aminoalkyl group attached to the silicon atom through the oxygen or nitrogen atoms respectively, in an alkoxysilyl or aminosilyl linkage.

More specifically, the catalysts of this invention may be any suitable aminosilyl-N-heterocyclic or monosiloxy-N-heterocyclic compound and may have the formula I
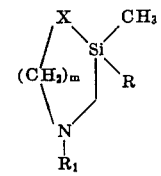

wherein $R_1$ has the meaning indicated above, X is either NZ or O, Z is either hydrogen or an alkyl radical having from one to about 12 carbon atoms, $m$ is an integer of from 2 to 4 and $R_3$ is an alkoxy radical having from one to 12 carbon atoms, an alkyl radical having from one to four carbon atoms, or

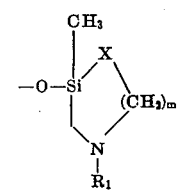

where X, $m$ and $R_1$ have the meanings indicated above, including for example:

xii. 1,2,2,4-tetramethyl-2-sila-piperazine having the formula

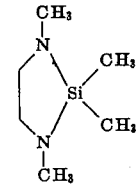

i. 2-ethoxy-2,4-dimethyl-2-sila morpholine when X is oxygen, $R_3$ is $-OC_2H_5$, $R_1$ is $CH_3$ and $m=2$;
ii. 2-t-butoxy-2,4-dimethyl-2-sila morpholine when X is oxygen, $R_3$ is $-OC(CH_3)_3$, $R_1$ is $CH_3$ and $m=2$;
iii. di-(2,4-dimethyl-1-oxa-2-sila-4-aza-cyclohexanyl-(2)) ether when X is oxygen, $R_3$ is

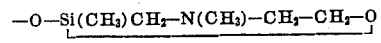

$R_1$ is $CH_3$ and $m=2$.
xiii. 2,2,4-trimethyl-2-sila-morpholine when X is oxygen, $R_3=CH_3$, $R_1=CH_3$ and $m=2$, and also the following compounds:

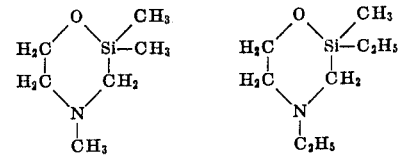

The catalysts of this invention may also be any suitable aminomethyl silane and may have the formula II
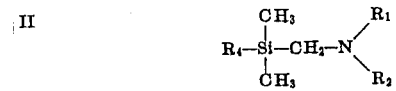

wherein $R_1$ and $R_2$ have the meaning indicated above and $R_4$ is an alkoxy group having from one to 12 carbon atoms or a morpholine group, including, for example:
iv. diethylaminomethyl-dimethyl-ethoxy silane when $R_1$ and $R_2$ are each $C_2H_5$ and $R_4$ is $-O-C_2H_5$;

v. diethylaminomethyl-dimethyl-*t*-butoxy silane when $R_1$ and $R_2$ are each $C_2H_5$ and $R_4$ is $-O-C-(CH_3)_3$;

vi. diallylaminomethyl-dimethylethoxy silane when $R_1$ and $R_2$ are each $-CH_2-CH=CH_2$ and $R_4$ is $-O-C_2H_5$;

vii. morpholinyl-(1)-methyl-dimethyl-morpholino silane when $R_{1,2}$ is the group $-CH_2-CH_2-O-CH_2-CH_2-$ and $R_4$ is

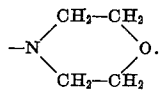

The catalysts of this invention may further be any suitable *a,w*-bis(dialkylaminomethyl)polysiloxane and may have the formula III 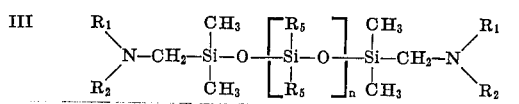

wherein $R_1$ and $R_2$ have the meanings indicated above, $R_5$ may be the same or different lower alkyl radical having from one to four carbon atoms, phenyl radical or vinyl containing radical having from two to four carbon atoms, and *n* may have a value of from 0 to 4, including for example:

viii. 1,3-bis-(morpholinyl-(1)-methyl)-tetramethyl disiloxane when $R_{1,2}$ is $-CH_2-CH_2-O-CH_2-CH_2-$, and $n=0$;

ix. 1,3-bis-(piperidinyl(1)methyl)-tetramethyl disiloxane when $R_1$ 2 is $-CH_2-CH_2-CH_2-CH_2-CH_2-$, and $n=0$;

x. 1,3-bis-(pyrrolidinyl-(1)-methyl)-tetramethyl disiloxane when $R_{1,2}$ is $-CH_2-CH_2-CH_2-CH_2-$, and $n=0$;

xi. 1,3-bis-(diallylaminomethyl(-tetramethyl disiloxane when $R_1$ and $R_2$ are each $-CH_2-CH=CH_2$, and $n=0$; 1,3-bis(diethylaminomethyl)-tetramethyl-disiloxane, 1,3-bis(dimethylaminomethyl)tetramethyldisiloxane, 1,3-bis(di-n-propylaminomethyl)tetramethyldisiloxane, 1,3-bis(cyclohexyl-methyl-aminomethyl)tetramethyldisiloxane and 1,5-bis(dimethylaminomethyl)-3-phenyl-1,1,3,5,5-pentamethyl-trisiloxane.

Some further specific examples of monoaminosilyl-N-heterocyclic and monosiloxy-N-heterocyclic catalysts are, for example, 2-methoxy-2-methyl-4-(octylene-1)-oxa-2-sila-4-aza-cycloheptane, 2-ethoxy-2-methyl-4-(cyclopropylene-1)-oxa-2-sila-4-aza-cyclooctane, 2-propoxy-2-methyl-4-(cyclododecylene-1)-oxa-2-sila-4-aza-cyclohexane, 2-butoxy-2-methyl-4-(vinylene-1)-oxa-2-sila-4-aza-cylcoheptane, 2-pentoxy-2-methyl-4-(octenylene-6)-1-oxa-2-sila-4-aza-cylcooctane, 2-hexoxy-2-methyl-4-(2-methylphenylene)-1-oxa-2-sila-4-cyclohexane, 2-octoxy-2-methyl-4-(5-butylphenylene)-1-oxa-2-sila-4-aza-cycloheptane. 2-heptoxy-2-methyl-4-cyclopropylene-1-oxa-2-sila-4-aza-cyclooctane, 2-decoxy-2-methyl-4-cylcooctylene-1-oxa-2-sila-4-aza-cyclohexane, di(2-methyl-4-octylene-1-oxa-2-sila-4-aza-cycloheptane-(2)) ether, di(2-methyl-4-cyclopropylene-1-oxa-2-sila-4-aza-cyclooctane-(2)) ether, di(2-methyl-4-cyclododecylene-(2)) oxa-2-sila-4-aza-cyclohexane-(2)) ether, di(2-methyl-4-vinylene-1-oxa-2-sila-4-aza-cycloheptane-(2)) ether, di(2-methyl-4-octenylene, 6-1-oxa-2-sila-4-aza-cyclooctane-(2)) ether, di(2-methyl-4-(2(methylphenylene)-1-oxa-2-sila-4-aza-cyclohexane-(2)) ether, di(2-methyl-4-(5-butylphenylene)-1-oxa-2-sila-4-aza-cycloheptane(2)) ether, di(2-methyl-4-cyclopropylene-1-oxa-2-sila-4-aza-cyclooctane-(2)) ether, di(2-methylcyclooctylene-1-oxa-2-sila-4-aza-cyclohexane-(2)) ether, 2,2,4-trimethyl-2-sila-morpholine, 2,2-urethyl-4-ethyl or -propyl or *n*-butyl-2-sila-morpholine and 2,2-dimethyl-4-propyl-1-oxa-2-sila cycloheptane and the like.

Some further specific examples of amino methyl silanes are, for example, methyl, octylaminomethyldimethylmethoxy silane; dicyclohexylaminomethyldimethylethoxy silane; cyclopropyl, cyclopentylaminomethyldimethylpropoxy silane; methyl, cyclodecylaminomethyldimethylbutoxy silane; vinyl, 5-octenylaminomethyldimethylpentoxy silane; tolyl, methylaminomethyldimethylhexoxy silane; dibenzyl-aminomethyldimethyl methoxy silane; xylyl, ethylaminomethyldimethylheptoxy silane; 3-butylphenyl, methylaminomethyldimethyloctoxy silane; morpholinyl(1)methyldimethyl-*t*-butoxy silane; piperidinyl(1)methyldimethyldecoxy silane; pryrrolidinyl(1)methyldimethyldodecoxy silane; cyclopropylaminomethyldimethylmethoxy silane; cyclododecylaminomethyldimethyl-morpholino silane; diallyl aminomethyldimethylnonoxy silane; morpholine methyldimethylmethoxy silane and the like.

Some further examples of *a,w*-bis-(dialkylaminomethyl)polysiloxanes are, for example, 1,3-bis-(octyl,methylaminomethyldimethylsiloxy)di-(3-butenyl)silane, 1,3-bis-(cyclopropyl, butylaminomethyldimethylsiloxy) divinyl silane, 1,3-bis-(tolyl,ethylaminomethyldimethylsiloxy)-diethyl silane, 1,3-bis-(4-butylphenyl,pentylaminomethyldimethylsiloxy)-ditolyl silane, 1,3-bis-(dibenzyl-aminomethyldimethylsiloxy)diphenyl silane, 1,3-bis-(7-octenyl, methylaminomethyldimethylsiloxy)dixylyl silane, 1,3-bis-(dicyclopropyl-aminomethyldimethylsiloxy)dibenzyl silane, 1,3-bis(dicyclohexyl-aminomethyldimethylsiloxy)-dipropyl silane, 1,3-bis-(xylyl,vinylaminomethyldimethylsiloxy)dibutyl silane, 1,3-bis-(pyrrolidinylmethyldimethylsiloxy)diphenyl silane, 1,3-bis-(cyclododecylaminomethyldimethylsiloxy)diallyl silane, 1,3-bis-(octenyl, cycloheptylaminomethyldimethylsiloxy)distyryl silane, 1,3-bis-(cyclopropylaminomethyldimethylsiloxy)di(7-octenyl)-silane, 1,3-bis-(morpholinyl(1)methyl)hexamethyl trisiloxane, 1,3-bis-(piperidinyl(1)methyl)hexamethyl trisiloxane, 1,3-bis-(pyrrolidinyl(1)methyl)hexamethyl trisiloxane, 1,3-bis-(diallyl aminomethyl) hexamethyl trisiloxane, 1,3-bis-(octyl, methylaminomethyldimethylsiloxy)tetra(3-butenyl)disiloxane, 1,3-bis-(cyclopropyl,butylaminomethyldimethylsiloxy)tetravinyl disiloxane, 1,3-bis-(tolyl,ethylaminomethyldimethylsiloxy)tetraethyl disiloxane, 1,3-bis-(4-butylphenyl, pentylaminomethyldimethylsiloxy)tetratolyl disiloxane, 1,3-bis-(dibenzyl-amino-methyldimethylsiloxy)tetraphenyl disiloxane, 1,3-bis-(7-octenyl, methylaminomethyldimethylsiloxy)tetraxylyl disiloxane, 1,3-bis-(dicyclopropyl-aminomethyldimethylsiloxy)tetrabenzyl disiloxane, 1,3-bis-(dicyclohexyl-aminomethyldimethylsiloxy)tetrapropyl disiloxane, 1,3-bis-(xylyl,vinylaminomethyldimethylsiloxy)tetrabutyl disiloxane, 1,3-(pyrrolidinylmethyldimethylsiloxy)tetraphenyl disiloxane, 1,3-bis-(cyclodocecylaminomethyldimethylsiloxy)tetraallyl disiloxane, 1,3-bis-(octenyl, cycloheptylaminomethyldimethylsiloxy)tetrastyryl disiloxane, 1,3-bis-(cyclopropylaminomethyldimethylsiloxy)tetra(7-octenyl)disiloxane, 1,3-bis-(morpholinyl-(1)methyl)octomethyl tetrasiloxane, 1,3-bis-(piperidinyl(1)methyl)octomethyl tetrasiloxane, 1,3-bis-(pyrrolidinyl(1)methyl)octomethyl tetrasiloxane, 1,3-bis-(diallyl aminomethyl)octomethyl tetrasiloxane, 1,3-bis-(octyl, methylaminomethyldimethylsiloxy)hexa(3-butenyl)trisiloxane, 1,3-bis-(cyclopropyl,butylaminomethyldimethylsiloxy)hexavinyl trisiloxane, 1,3-bis-(tolyl,ethylaminomethyldimethylsiloxy)hexaethyl trisiloxane, 1,3-bis-(4-butylphenyl, pentylaminomethyldimethylsiloxy)-hexatolyl trisiloxane, 1,3-bis-(7-octenyl, methylaminomethyldimethylsiloxy)hexaxylyl trisiloxane, 1,3-bis-(dicyclopropyl-aminomethyldimethylsiloxy)hexaethyl trisiloxane, 1,3-bis-(dicyclohexyl-aminomethyldimethylsiloxy)hexapropyl trisiloxane, 1,3-bis-(xylyl,vinylaminomethyldimethylsiloxy)hexabutyl trisiloxane, 1,3-bis-(pyrrolidinylmethyldimethylsiloxy)-hexaphenyl trisiloxane, 1,3-bis-(cyclodecylaminomethyldimethylsiloxy)hexaallyl trisiloxane, 1,3-bis-(octenyl,cycloheptylaminomethyldimethylsiloxy)hexastyryl trisiloxane, 1,3-bis-(cyclopropylaminomethyldimethylsiloxy)hexa(7-octenyl) trisiloxan 1,3-bis-(piperidinyl(1)methyl)decamethyl pentasiloxane, 1,3-bis-(pyrrolidinyl(1)methyl)decamethyl pentasiloxane, 1,3-bis-(diallyl aminomethyl(decamethyl pentasiloxane, 1,3-bis-(octyl,methylaminomethyldimethylsiloxy)octo(3-bute-nyl)tetrasiloxane, 1,3-bis-(cyclopropyl, butylaminomethyl-dimethylsiloxy)octovinyl tetrasiloxane, 1,3-bis-(tolyl,ethylaminomethyldimethylsiloxy)octoethyl tetrasiloxane, 1,3-bis-(4-butylphenyl,pentylaminomethyldimethylsiloxy)octotolyl tetrasiloxane, 1,3-bis-(7-octenyl, methylaminomethyldimethylsiloxy) octoxylyl tetrasiloxane, 1,3-bis-(dicyclopropyl-aminomethyldimethylsiloxy)octoethyl tetrasiloxane, 1,3-bis-(dicyclohexyl-aminomethyldimethylsiloxy)octopropyl tetrasiloxane, 1,3-bis-(xylyl,vinylaminomethyldimethylsiloxy)-octobutyl tetrasiloxane, 1,3-bis-(pyrrolidinylmethyldimethylsiloxy)octophenyl tetrasiloxane, 1,3-bis-(cyclododecylaminomethyldimethylsil oxy)octoallyl tetrasiloxane, 1,3-bis-(octenyl,cycloheptylaminomethyldimethylsiloxy)octostyryl tetrasiloxane, 1,3-bis-(cyclopropylaminomethyldimethylsiloxy)octo(7-octenyl)tetrasiloxane, 1,3-bis-(morpholinyl(1)methyl)-dodecamethylhexasiloxane, 1,3-bis-(piperidinyl(1)meth yl)dodecamethyl hexasiloxane, 1,3-bis-(pyrrolidinyl(1)met hyl)dodecamethyl hexasiloxane, 1,3-bis-(diallyl aminomethyl)dodecamethyl hexasiloxane, 1,3-bis-(diethyl-aminomethyl)-tetramethyl disiloxane, 1,3-bis-(dimethylaminomethyl)-tetramethyl disiloxane, 1,3-bis-(di-$n$-propylaminomethyl)-tetramethyl disiloxane, 1,3-bis-(cyclohexyl-methyl-aminomethyl)-tetramethyl disiloxane, 1,5-bis-(dimethylaminomethyl)-3-phenyl-1,1,3,5,5-pentamethyl trisiloxane and the like.

Compounds described here became known in recent years, for instance Simmler in Ber. 94, 1585(1969) and 96, 349(1963). Niederprum and Simmler in Ber. 96, 954(1963) as well as German Pat. No. 1,229290 and Dutch Published application 6003595. Monosilamorpholines with only one hydrocarbon radical attached to the silicon atom, the second radical being alkoxy or siloxy are heretofore unknown; they can be conveniently prepared by reacting for instance a mixture consisting of N-Methyl-ethanolamine, ethanol, triethylamine and bromomethyl-methyl-dichloro-silane.

It has been found, surprisingly, that the tertiary amine containing silicones of this invention have an exceptionally high catalytic influence on the reactions taking place during the production of a cellular polyurethane. The catalytic activity of these compounds is even greater than that of any of the tertiary amines previously known including triethylene diamine, and as a result, they are especially advantageous in the production of foam plastics from relatively inert polyhydroxyl compounds such as, for example, polyethers containing predominantly or exclusively secondary hydroxyl groups.

A further advantage of the catalysts of this invention is that both the blowing reaction and the cross-linking reactions are catalyzed, making it possible to reduce or even dispense with the addition of the compounds specifically used for catalyzing the cross-linking reaction such as, for example, the organometallic catalysts.

In addition, the catalysts of this invention are advantageous because they do not impart to the foam the strong odor of the amine catalyst generally used in conventional processes.

All of the objects of this invention as well as the aforementioned advantageous aspects are achieved according to this invention if, as a catalyst for the polyurethane foam forming reaction, a catalytic amount of a compound having the grouping

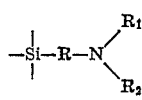

is used. Of the myriad compounds which contain such a grouping, however, the novel and unexpected results of this invention are achieved only by those compounds in which R is $CH_2$ and $R_1$ and $R_2$ are the same or different alkyl, cycloalkyl, alkoxyalkyl, alkenyl and/or aralkyl radicals or are members of a common cycloaliphatic or heterocyclic structure when the silicon atom is part of a silane or lower polysiloxane grouping; or when $R_1$ has the above meaning and $R_2$ is an hydroxyalkyl or aminoalkyl group attached to the silicon atom through the oxygen or nitrogen atoms respectively in an alkoxysilyl or aminosilyl linkage.

This startling result is illustrated by the fact that compounds which are to a large extent analogous to the compounds hereinbefore defined do not exert the catalytic effect of the compounds of this invention. For example, structurally similar compounds such as the 2,6-disilamorpholines having lower alkyl or aryl radicals attached to the nitrogen and/or silicon atoms and having the general formula

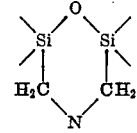

are completely inactive. Triorgano-dialkylaminoalkyl silanes of the formula

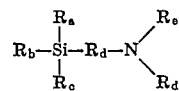

and similar compound in which the bridge between the silicon and nitrogen atoms is not a methylene group but a propylene or butylene group or the like, are similarly inactive. Residual cycloaliphatic amino groups prove to be effective substituents on the carbon atoms of the $b$-sila-ethyl group of the catalyst molecule, but only if the remaining substituents are within the definitions outlined by this invention. Trialkylsilylmethyl groups attached to the nitrogen of cycloaliphatic or heterocycloaliphatic compounds, for instance, are not effective.

Although the catalysts of this invention are excellent accelerators when used alone, they may also be used in admixture with other tertiary amines and/or organometallic compounds such as those described in German Pat. specification No. 958,774, German Auslegeschrift No. 1,028,773 and British Pat. specification No. 875,434. Even beyond these auxiliary accelerators, any other suitable catalysts as those set out in the Journal of Applied Polymer Science, Volume IV, Issue No. 11, pp. 207–211 (1960), Industrial Engineering Chemistry, 141st Meeting ACS, Washington, D.C., Mar. 1962, tertiary amines such as dimethylbenzylamine, N-alkylmorpholine, N,N'-dialkylpiperazine, N,N'-endoethylenepiperazine, 1-alkoxy-3-dimethylaminopropane, as well as bases free of nitrogen such as, for example, alkalies, alkali metal phenolates or alkaline earth metal oxides or salts of amines with organic acids may be used. It is particularly preferred to use catalysts in which an organic metal compound is in the form of a complex or mixture with a sila-amine of the class set forth above or a mixture of such a sila-amine and a tertiary amine. It has been found that, in cases where complexes such as these are used in pure form or in solution, or in cases where mixtures of organic metal compounds and sila-amines of the invention or mixtures of these sila-amines and tertiary amines are used as foaming catalysts, instead of the organic metal compounds alone either in pure form or in admixture with solvents, the following technical advantages are obtained:

a. Under otherwise completely unchanged foaming conditions and with the same type of composition, shorter reaction times are obtained by replacing the organometallic catalysts normally used with an equivalent quantity of the complex or mixed catalysts. In other words, both the gas-forming reaction (so-called expansion reaction) and the so-called cross-linking reaction are highly accelerated to a greater or lesser extent;

b. The permeability to air (i.e., the open-cellular nature) of the foams is not only improved, it is also possible, by using the complex or mixed catalysts, to obtain open-cell foams at extremely high catalyst concentrations at which closed-cell or shrinking foams are inevitably obtained when using high concentrations of the unmixed catalysts.

These two advantages may be industrially utilized to good effect in the production of foams showing a high or extremely high permeability to air. The range of application of the process is broadened with the aid of the complex or mixed catalysts. The metering margin between "crack and shrinkage" is increased, thus raising the reliability of production very considerably. Accordingly, it is either possible to operate at very low catalyst concentrations without excessively long reaction times and the danger of crack formation, or alternatively short reaction times can be obtained by increasing the catalyst concentration without any danger of closed-cell foams being formed. The second of these two alternatives is preferred in many instances because the danger of crack formation is minimized.

The catalyst complexes, which occasionally can be isolated in substance, are linked through secondary valences (some very loose) and which are in different equilibria with their starting materials, irrespective of the type and quantity of any other components present. For example, it is possible to isolate crystalline deposits with the composition of a 1:1-complex after a few hours or days from mixtures of 2,24-trimethyl-2-sila morpholine and stannous octoate, providing these are present in substantially equimolar proportions. In solution, however, complexes of this kind are largely dissociated.

The complex or mixed catalysts used in accordance with a preferred embodiment of the invention are a complex or mixture of an organic metal compound, preferably an organic tin compound, and a sila-amine of the invention or a mixture of the sila-amine and another tertiary amine. Suitable organic metal compounds include those normally used in the production of polyurethane foams, for example organic lead, cobalt, iron, titanium or molybdenum compounds.

Specific examples of suitable organic metal compounds are: lead 2-ethylhexoate, lead benzoate, lead oleate, stannous di(2-ethyl hexoate), stannous octoate, stannous oleate, dibutyltin di(2-ethylhexoate), dibenzyltin di(2-ethylhexoate), dibutyltin dilaurate, dibutyltin diisooctylmaleate, dibutyltin dibutoxide, di(2-ethylhexyl) tin oxide, tetrabutyl titanate, ferric 2-ethylhexoate, ferric acetylacetonate, cobalt benzoate, cobalt 2-ethylhexoate, molybdenum hexacarbonyl. Complexes and/or mixtures of organic tin compounds with sila-amines, or of organic tin compounds with mixtures of sila-amines and tertiary amines are preferably used. The complex or mixed catalysts used in accordance with a preferred embodiment of the invention are prepared simply by mixing (preferably at room temperature) the organic metal compound with the sila-amine or the mixture of sila-amine and tertiary amine, the sequence in which the components are introduced being unimportant. Following its preparation, the catalyst is fully active and may be used in this form for the production of foam plastics. It is also possible to dissolve the catalyst thus prepared and to use it in solution for the production of foams.

The catalysts of this invention may be added to the foam forming reaction mixtures in any desired quantity, depending on the reactivity of the components. Quantities of from about 0.01 to about 5 percent by weight are generally employed, but preferably, about 0.03 to about 2 percent by weight, based on the quantity of polyhydroxyl compound being used.

In the production of foam plastics containing urethane groups, a compound containing at least two active hydrogen containing groups as determined by the Zerewitinoff method is reacted with a polyisocyanate in the presence of water or any other suitable blowing agent.

Any suitable active hydrogen containing compound reactive with an isocyanate may be used such as, for example, linear or branched polyethers containing hydroxyl groups, linear or branched polyesters, polythioethers, polyacetals containing hydroxyl groups and the like and mixtures thereof. The linear or branched polyethers suitable for the production of foam plastics containing urethane groups contain predominantly secondary hydroxyl groups and have an hydroxyl equivalent of preferably about 100 to about 3,000, the hydroxyl equivalent being understood to mean the quantity of polyether in grams which contains 1 mol of hydroxyl groups. Examples of some such suitable compounds are the pure polymers of the alkylene oxides such as propylene oxide, 1,2-, 1,3- and 2,3-butylene oxide, amylene oxide, tetrahydrofuran, styrene oxide, epichlorohydrin and the like as well as the addition products obtained by reacting the alkylene oxides in an acid or basic medium with di- or polyhydric alcohols and phenols such as, for example, ethylene glycol, diethylene glycol, polyethylene glycol, propane-1,2-diol, propane-1,3-diol, butanediols, alkanediols, butene-2-diol-1,4, butine-2-diol-1,4, glycerol, butanetriols, hexanetriols, pentaerythritol, trimethylol-propane, hydroquinone, sorbitol, sucrose, 4,4 '-dihydroxy-diphenylmethane, 4,4'-dihydroxy-diphenyl-dimethylmethane, 4,4'-dihydroxy-dicyclohexylmethane, 4,4'-dihydroxy-dicyclohexyldimethylmethane, dihydroxynapthalenes, or the addition products of alkylene oxides with aliphatic or aromatic mono- or polyamines containing several active hydrogen atoms such as, for example, ammonia, diethanolamine, triethanolamine, dipropanolamine, tripropanolamine, diethanolpropanolamine, tributanolamine, 2,4-tolylene diamine, 4,4'-diphenylmethane diamine, p,p',p''-triphenylmethane triamine, ethylene diamine, propylene diamine, propylene triamine, N,N,N',N'-tetrakis-(2-hydroxypropyl)ethylene diamine, diethylene triamine and the like, or the addition products of alkylene oxides with amino alcohols such as ethanol-amine, N-alkyl-ethanolamines, diethanolamine, N-alkyl-diethanolamines, triethanolamine, ethylenediamine, aniline, tetra- or hexa-methylenediamine or diethylenetriamine or with compounds which contain several hydrogen atoms and are capable of adding alkylene oxide groups, for example compounds such as sugar or castor oil. In the polymerization or addition reaction, up to about 30 percent of pure ethylene oxide for example, may be mixed with the substituted ethylene oxides for example, in which case the incorporation of the ethylene oxide may proceed either by copolymerization or by subsequent graft polymerization.

Any suitable linear or branched hydroxyl polyester including lactone polyesters, which contain primary and/or secondary hydroxyl groups as end groups and have an hydroxyl equivalent of preferably about 100 to about 300, the hydroxyl equivalent being understood to mean the quantity of polyester in grams which contains 1 mol of hydroxyl groups, may be used in the preparation of polyurethane foams. The polyesters are produced by the usual polycondensation of dicarboxylic acids or their anhydrides, alone or in admixture with tri- or polycarboxylic acids and diols, either alone or in admixture with other polyvalent hydroxyl compounds such as glycerol, trimethylolpropane, pentaerythritol, castor oil, hexanetriol and the like. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

Any suitable polyhydric polythioehter may be used in the preparation of the polyurethanes such as, for example, the condensation product of thiodiglycol or the reaction product of a polyhydric alcohol, such as are disclosed herein for the preparation of the hydroxyl polyesters, with any other suitable thioetherglycol. Other suitable polyhydric polythioethers are disclosed in U.S. Pat. Nos. 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth herein or they may be made using the same components that make up the hydroxyl polyester with only a portion of the components being a diamine such as ethylene diamine and the like.

Any suitable polyacetal may be used such as, for example, the reaction product of formaldehyde or any other suitable aldehyde with a polyhydric alcohol such as those disclosed herein for the preparation of the hydroxyl polyesters.

Any suitable aliphatic polyol may be used, such as, for example, alkane diols including, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol, 1,20-eicosane diol and the like; alkene diols such as, for example, 1-butene-1,4-diol, 1,3-butadiene-1,4diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any silicone resins which contain free hydroxyl groups such as, for example,

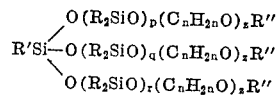

wherein R, R' and R'' are alkyl radicals having one to four carbon atoms but at least one R'' is hydrogen; $p$, $q$ and $r$ each have a value of from four to eight and $(C_nH_{2n}O)_z$ is a mixed polyoxyethylene oxypropylene group containing from 15 to 19 oxyethylene units and from 11 to 15 oxypropylene units with $z$ equal to from about 26 to about 34 may also be used as polyhydroxy compounds; as well as phenol-formaldehyde condensates. Addition products of alkylene oxides to ammonia, amines or hydrazines such as triethanolamine, triisopropanolamine and the like as well as polycarbonates having free hydroxyl groups may also be used.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including, for example, aromatic polyamines such as p-amino aniline, 1,5-diamino naphthalene, 2,4-diamino toluene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethylene triamine, triethylene tetramine, 1,3,6-hexane triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazole and the like.

Some useful compounds having predominantly secondary hydroxyl groups are castor oil, brominated or hydrogenated castor oil, reaction products of castor oil with polyhydric alcohols, octadecene-9-diol-1,12, polyether alcohols derived from propylene oxide and a polyhydric alcohol, an amine, hydrazine or ammonia, epoxy resins produced from polyhydric alcohols or phenols with epichlorohydrin in alkaline solution and the like and mixtures thereof.

Any suitable polyisocyanate may be used to prepare the polyurethane such as, for example, aliphatic, araliphatic or aromatic polyisocyanates including phenylene diisocyanates, 2,4- and/or 2,6-toluylene diisocyanate, diphenylmethane-4,4'-diisocyanate, 4,4'-bis-phenylene diisocyanate, 1,5-naphthalene diisocyanate, hexamethylene diisocyanate, decamethylene diisocyanate, ethylene diisocyanate, butylene diisocyanate, dipropyldiisocyanato ether, 2,2-dimethylpentylene diisocyanate, 3-methoxyhexamethylene diisocyanate, 1,4-butylene glycol propylether diisocyanate, undecamathylene diisocyanate, dodecamethylene diisocyanate, 1,3-dimethylbenzene diisocyanate, 1,4-dimethylbenzene diisocyanate, 1,2-dimethylcyclohexane diisocyanate, 1,4-diethylbenzene diisocyanate, 1,4-dimethylnaphthalene diisocyanate, 1,5-dimethylnaphthalene diisocyanate, biuret triisocyanates, e.g., from 3 mols hexamethylene diisocyanate and 1 mol water, carbodiimides with free terminal NCO groups, e.g., from polyisocyanates with catalysts such as phosphine oxides, dimers having free NCO groups, 1-methylbenzyl-2,4,6-triisocyanate, 1,3,5-trimethylbenzyl-2,4,6-triisocyanate, naphthalene-1,3,7-triisocyanate, 3-methyldiphenylmethane-4,6,4'-triisocyanate 4,4'-dimethyldiphenylmethane-2,2',5,5'-tetraisocyanate, triphenylmethane-4,4',4''-triisocyanate and the like. Further, addition reaction products of an excess of a polyisocyanate with an alcohol such as trimethylolpropane, glycerol, hexanetriol, a glycol, or a lower molecular weight polyester such as castor oil, or the reaction product of an excess of any suitable isocyanate with an acetal in accordance with German Pat. No. specification 1,072,385 or with any of the hereinbefore enumerated active-hydrogen containing compounds may be used as desired, as well as the isocyanates mentioned in German Pat. specification Nos. 1,022,789 and 1,027,394.

The cellular structure of the polyurethane is obtained by adding water to the reaction mixture in which case, an excess of the isocyanate must be used corresponding to the amount of water being used in order to react with the water and liberate carbon dioxide. Instead of or in addition to water as the blowing agent, other materials may be used which function as blowing agents, such as, for example, low boiling hydrocarbons such as pentane, hexane, heptane, pentene, heptene and the like; azo compounds such as azohexahydrobenzodinitrile and the like, halogenated hydrocarbons such as dichlorodifluoroethane, dichlorodifluoromethane, trichlorofluoromethane, vinylidene chloride, methylene chloride, and the like.

It is often advantageous in the production of cellular polyurethane plastics to include other additives in the reaction mixture such as, for example, additives for controlling the pore size and cell structure, emulsifiers and plasticizers, foam stabilizers, coloring agents, fillers and the like. It is particularly advantageous to employ an emulsifier such as, for example, the addition products of alkylene oxide with substances containing hydrophobic hydroxyl or amino groups, sulfonated castor oil and/or a foam stabilizer such as a silicone oil including, for example, water soluble organopolysiloxane-polyalkylene glycol ethers, a polydimethyl siloxane or an alkyl silane polyoxyalkylene block copolymer; the latter type of silicone oil is disclosed in U.S. Pat. No. 2,834,748.

The production of the foam plastic itself is carried out by known processes at room temperature or at elevated temperatures by simply mixing the polyisocyanates with the active hydrogen containing compounds, using water or any other suitable blowing agent, emulsifiers, foam stabilizers and/or any other auxiliary agents. In this operation, a mechanical apparatus such as is described, for example, in French Pat. specification No. 1,074,713 or U.S. reissue 24,514 is advantageously employed.

The foams prepared with the catalysts of this invention are outstanding products suffering from none of the disadvantages that inhere in the use of prior art polyurethane foam catalysts. The foams may be flexible, rigid or any degree in between and may be used in any application for which foam materials are particularly suited such as in cushions, furniture, dashboards of automobiles, insulation, prefabricated housing and so on.

The invention is further illustrated but not limited by the following examples in which parts and percentages are by weight unless otherwise specified.

EXAMPLE 1

In the mixing chamber of a foaming machine, the following components are mixed together and thoroughly stirred:

About 100.0 parts of a partially branched polypropylene glycol (average molecular weight 2,500, hydroxyl number 56)
About 0.1 part 2,2,4-trimethyl-2-sila-morpholine
About 1.0 part water-soluble organopolysiloxane-polyalkylene glycol ether
About 0.5 part stannous octoate
About 3.0 parts water
About 41.0 parts toluylene diisocyanate (80 percent 2,4- and 20 percent 2,6-isomer)

and the liquid reaction mixture obtained is poured into molds or placed on the conveyor band of the apparatus, where foam-formation takes place after about 10 seconds and is terminated after a further 60 seconds with formation of a soft, elastic foam plastic.

Experiment for comparison

Under the same conditions, triethylene diamine is used as the catalyst and the following components are mixed together;

About 100.0 parts of a partially branched polypropylene glycol (mean molecular weight 2,500, hydroxyl number 56)
About 0.3 part triethylene diamine
About 1.0 part water-soluble organopolysiloxane-polyalkylene glycol ether
About 0.3 part stannous octoate
About 3.0 parts of water
About 41.0 parts toluylene diisocyanate (80 percent 2,4- and 20 percent 2,6-isomer).

After introduction of the liquid reaction mixture into the molds or on to the conveyor band of the apparatus, foam formation sets in after about 11 seconds, and after a further 65 seconds a soft, elastic polyurethane foam plastic forms.

The mechanical properties of the two foam plastics are listed in table I. This table shows that the two foam plastics have practically the same physical properties but in the method according to the invention smaller quantities of catalyst were required.

TABLE I

| | Example 1 | Experiment for comparison |
|---|---|---|
| Density DIN 53420 (kg./m.³) | 31 | 32 |
| Tensile strength DIN 53571 (kg. wt. /cm.²) | 0.8 | 0.8 |
| Elongation at break DIN 53571 (%) | 160 | 135 |
| Compressive strength at 40% deflection DIN 53577 (p./cm.²) | 39 | 39 |
| Compression set 22 h-70° C. DIN 53573 (%) | 2.0 | 1.9 |

EXAMPLE 2

The following components are introduced into the mixing chamber of a foaming machine and thoroughly stirred:

About 100.0 parts of a partially branched polypropylene glycol (mean molecular weight 2,500, hydroxyl number 56)
About 0.1 part 2,2,4-trimethyl-2-sila-morpholine
About 1.0 part water-soluble organopolysiloxane-polyalkylene glycol ether
About 0.15 part stannous octoate
About 5.0 parts water
About 62.0 parts toluylene diisocyanate (80 percent 2,4- and 20 percent 2,6-isomer).

When it has left the apparatus, the well mixed material is poured into molds or placed on the conveyor band of the apparatus, where foam formation takes place after 12 seconds and after a further 52 seconds a soft elastic foam plastic having a density of about 21 kg./m.³ forms.

EXAMPLE 3

The following components are mixed together in the mixing chamber of a foaming apparatus and thoroughly stirred;

About 100.0 parts of a weakly branched polypropylene glycol (mean molecular weight 2,500, hydroxyl number 56)
About 0.25 part 1,3-bis(diethyl-aminomethyl)-tetramethyl-disiloxane
About 1.0 part water-soluble organopolysiloxane-polyalkylene glycol ether
About 0.1 part stannous octoate
About 3.0 parts water
About 41.0 parts toluylene diisocyanate (80 percent 2,4- and 20 percent 2,6-isomer), and the liquid reaction mixture obtained is poured into molds or placed on the conveyor band of the apparatus, where foam formation takes place after about 11 seconds and a soft elastic foam plastic forms after a further 55 seconds. The foam plastic obtained from the liquid reaction mixture has very good physical properties; at a density of about 33 kg./m.³, a tensile strength of about 0.9 kg.wt./cm.², an elongation at break of about 145 percent, a compressive strength (at about 40 percent compression) of about 37 g./cm.² and an impact elasticity of about 55 percent are obtained. The compression set after about 22 hours at about 70° C. is 3.9 percent.

EXAMPLE 4

About 100 parts of a weakly branched polypropylene glycol mean molecular weight about 2,500, hydroxyl number 56) are mixed with about 51.5 parts of toluylene diisocyanate (80 percent 2,4- and 20 percent 2,6-isomer) and with about 1.0 part of a water-soluble organopolysiloxane-polyalkylene glycol polyether, about 0.25 part of 1,3-bis-(diethylaminomethyl) tetramethyl-disiloxane, about 4.0 parts of water and about 0.1 part of stannous octoate. The foam plastic which begins to form after about 12 seconds from the reaction mixture, the formation of which is completed after a further 50 seconds, has very good physical properties; at a density of about 24 kg./m.³, a tensile strength of about 0.9 kg.wt./cm.², elongation at break of about 170 percent, compressive strength (at about 40 percent compression) of about 33 g./cm.² and impact elasticity of about 47 percent are achieved. The compression set after about 22 hours at about 70° C. is about 3.7 percent.

EXAMPLES 5-7

The components given in table II are intimately mixed together and the liquid reaction mixture obtained is poured into molds or placed on the conveyor band of a foaming apparatus. Foam formation sets in after the cream times indicated in the table and is completed after the rise times given with formation of a soft elastic foam plastic. In each case, foam plastics are obtained which have very good physical properties and for the production of which a smaller quantity of catalyst is required than in the case of the strongly active compounds hitherto known.

TABLE II

| | Examples | | |
|---|---|---|---|
| | 5 | 6 | 7 |
| Partially branched polypropylene glycol (mean molecular weight 2500, OH number 56) | 100 | 100 | 100 |
| 1,3-bis(dimethylaminomethyl)-tetramethyldisiloxane | 0.2 | — | — |
| 1,3-bis(di-n-propylaminomethyl)tetramethyldisiloxane | — | 0.25 | — |
| 1,3-bis(cyclohexyl-methylaminomethyl)-tetramethyldisiloxane | — | — | 0.2 |
| water-soluble organopolysiloxane-polyalkylene glycol ether | 1.0 | 1.0 | 1.0 |
| stannous octoate | 0.15 | 0.2 | 0.2 |
| water | 3.0 | 3.0 | 3.0 |
| toluylene diisocyanate (80% 2,4- and 20% 2,6-isomer) | 38 | 38 | 38 |
| cream time (sec.) | 10 | 12 | 12 |
| rise time (sec.) | 50 | 55 | 52 |

EXAMPLES 8-12

The components given in table III are intimately stirred together and the liquid reaction mixture obtained is poured into molds or placed on the conveyor band of a foaming apparatus. After expiration of the given cream times, foam formation sets in and is completed at the end of the given rise times. In each case, soft foam plastics are obtained which have very good physical properties. The polyesters used in the experiments were obtained by condensation of adipic acid, diethylene glycol and trimethylolpropane.

TABLE III

| | Examples | | | | |
|---|---|---|---|---|---|
| | 8 | 9 | 10 | 11 | 12 |
| Weakly branched polyester (mean molecular weight 2000, OH number 60) | 100 | 100 | 100 | 100 | 100 |
| sodium castor oil sulfate (water content 50%) | 2.5 | 3.5 | 3.5 | 3.0 | 2.25 |
| hydroxyethylated diphenyl derivative | — | — | 1.0 | — | — |
| 1,3-bis(dimethyl-aminomethyl)tetramethyldisiloxane | 0.4 | — | — | — | — |
| 1,3-bis(di-n-propyl-aminomethyl)tetramethyldisiloxane | — | 0.75 | — | — | — |
| 1,3-bis(cyclohexylmethyl-aminomethyl)tetramethyldisiloxane | — | — | 0.4 | — | — |
| 2,2,4-trimethyl-2-sila-morpholine | — | — | — | 1.0 | — |
| 1,3-bis(diethylamino-methyl)tetramethyldisiloxane | — | — | — | — | 0.6 |
| water | 2.2 | 1.25 | 1.25 | 1.5 | 1.7 |
| toluylene diisocyanate (65% 2,4- and 35% 2,6-isomer) | 40 | 40 | 40 | 40 | 40 |
| cream time (sec.) | 11 | 11 | 15 | 9 | 9 |
| rise time (sec.) | 60 | 55 | 57 | 62 | 52 |

EXAMPLE 13

The following components are intimately mixed:
About 100.0 parts of a weakly branched polypropylene glycol (mean molecular weight 2,500, hydroxyl number 56)
About 0.3 part 2,2-dimethyl-4-n-butyl-2-sila-morpholine
About 0.2 part of stannous octoate
About 1.0 part of water-soluble organopolysiloxane-polyalkylene glycol ether
About 3.0 parts water
About 39.0 parts toluylene diisocyanate (80 percent 2,4- and 20 percent 2,6-isomer)
and the resulting liquid reaction mixture is poured into molds in which foam formation sets in after a short time. A soft elastic foam plastic is obtained which has good physical properties.

EXAMPLE 14

The components given below:
About 100.0 parts of a weakly branched polypropylene glycol (mean molecular weight 2,500, hydroxyl number 56)
About 0.3 part 2,2-dimethyl-4-n-propyl-2-sila-morpholine
About 0.15 part stannous octoate
About 1.0 part water-soluble organopolysiloxane-polyalkylene glycol ether
About 3.0 parts water
About 39.0 parts toluylene diisocyanate (80 percent 2,4- and 20 percent 2,6-isomer)
are intimately mixed and then poured into a mold. Foam formation sets in after about 20 seconds and is terminated after a further 70 seconds with formation of a soft elastic foam plastic. The foam plastic obtained has good physical properties.

EXAMPLE 15

The following components are intimately mixed:
About 100.0 parts of a weakly branched polypropylene glycol (mean molecular weight 2,500, hydroxyl number 56)
About 0.3 part 2,2-dimethyl-4-ethyl-2-sila-morpholine
About 0.15 part stannous octoate
About 1.0 part water-soluble organopolysiloxane-polyalkylene glycol ether
About 3.0 parts water
About 39.0 parts toluylene diisocyanate (80 percent 2,4- and 20 percent 2,6-isomer)
and the liquid reaction mixture obtained is poured into molds. Foam formation sets in after about 16 seconds elapses from the beginning of the stirring of the components and is terminated after a further 60 seconds. A soft elastic foam plastic forms which has good physical properties.

EXAMPLES 16-27

About 100 parts of a slightly branched polypropylene glycol (addition product of propylene oxide and trimethylol propane, having an average molecular weight of about 2,500, and an hydroxyl number of about 56) are combined with about 38.0 parts of toluylene diisocyanate (80 percent 2,4- and 20 percent 2,6-isomer), about 3.0 parts of water, and the quantities of water soluble organopolysiloxane-polyalkylene glycol ether, stannous octoate, and sila-modified tertiary amine catalyst given in table IV. The entire mass is thoroughly agitated, and the resulting liquid reaction mixture is poured into molds or discharged onto the conveyor belt of a foam machine. The foaming process sets in after the cream periods listed in table IV have elapsed, and are completed at the end of the rise times listed. In every case a foam with very good physical properties is obtained.

TABLE IV

| Example No. | Water soluble organopoly-siloxane-polyalkylene glycol-polyether, parts | Stannous octoate, parts | Catalyst Formula | Catalyst Quantity, parts | Foam Cream-time | Foam Rise time |
|---|---|---|---|---|---|---|
| 16 | 1.0 | 0.3 | i | 0.3 | 18 | 60 |
| 17 | 1.0 | 0.25 | ii | 0.4 | 22 | 70 |
| 18 | 1.0 | 0.3 | iii | 0.3 | 19 | 55 |
| 19 | 1.0 | 0.3 | iv | 0.2 | 25 | 62 |
| 20 | 1.0 | 0.35 | v | 0.25 | 25 | 70 |
| 21 | 1.5 | 0.35 | vi | 0.5 | 22 | 65 |
| 22 | 1.0 | 0.3 | vii | 0.7 | 20 | 60 |
| 23 | 1.0 | 0.3 | viii | 0.7 | 22 | 65 |
| 24 | 1.0 | 0.2 | ix | 0.3 | 20 | 50 |
| 25 | 1.0 | 0.25 | x | 0.075 | 30 | 70 |
| 26 | 1.0 | 0.3 | xi | 0.3 | 28 | 65 |
| 27 | 1.0 | 0.3 | xii | 0.3 | 25 | 70 |

EXAMPLES 28–31

The reaction components listed in table V are combined and thoroughly agitated. The resulting reaction mixture is poured into molds or discharged onto the conveyor belt of a foam machine. The foaming process sets in after the cream times given have elapsed, and will be completed after the rise times listed. In each case a flexible foam having very good physical properties is obtained. The polyester used is the condensation product of adipic acid, diethylene glycol, and trimethylol propane having an average molecular weight of about 2,000 and an hydroxyl number of about 60.

TABLE V

|  | Examples | | | |
|---|---|---|---|---|
|  | 28 | 29 | 30 | 31 |
| Polyester | 100 | 100 | 100 | 100 |
| Sodium-castor oil-sulfate (50% aq. sol.) | 3.0 | 3.0 | 1.6 | 2.5 |
| Oxethylated diphenyl derivative | 1.0 | 1.0 | — | 1.0 |
| Catalyst, formula ii | 1.0 | — | — | — |
| Catalyst, formula v | — | 0.85 | — | — |
| Catalyst, formula ix | — | — | 0.8 | — |
| Catalyst, formula x | — | — | — | 0.25 |
| Paraffin oil | 0.2 | 0.2 | — | 0.2 |
| Water | 1.5 | 1.5 | 2.2 | 1.75 |
| TDI (65/45 isomer ratio) | 40 | 40 | 40 | 40 |
| Cream time (sec.) | 10 | 10 | 10 | 10 |
| Rise time (sec.) | 72 | 68 | 60 | 70 |

EXAMPLES 32–34

The components specified in the table VI below are mixed intimately with one another and the resulting reaction mixture is poured into molds or delivered on the conveyor belt of a foaming machine. Foams begin to form after the cream times indicated, developing into soft elastic foams after the rise and gel times specified. In each instance, when the complex catalyst according to a preferred embodiment of the invention was used, foams with outstanding physical properties and a high permeability to air are formed. Table VI below shows the different reaction times are obtained, depending upon the sila-amine component used. The permeability of the foams to air is expressed in terms of a scale of 1 to 5; 1 representing very high and 5 representing poor permeability to air.

TABLE VI

|  | Examples | | |
|---|---|---|---|
|  | 32 | 33 | 34 |
| Partly branched polypropylene glycol terminally modified with ethylene oxide (average mol. wt. 3,500, OH-number 46) | 100.0 | 100.0 | 100.0 |
| 2,2,4-trimethyl-2-silamorpholine | 0.02 | 0.02 | 0.02 |
| Pentamethyldiethylene triamine | 0.05 | 0.05 | 0.05 |
| Water-soluble organopolysiloxane polyalkylene glycolether | 1.10 | 1.10 | 1.10 |
| Tolylene diisocyanate (80% 2,4- and 20% 2,6-isomer) | 39.00 | 39.00 | 39.00 |
| Water | 3.00 | 3.00 | 3.00 |
| Compound A* | 0.30 | — | — |
| Compound B* | — | 0.30 | — |
| Stannous octoate | — | — | 0.30 |
| Cream time (sec.) | 7 | 11 | 12 |
| Rise time (sec.) | 85 | 90 | 110 |
| Gel time (sec.) | 32 | 35 | 60 |
| Permeability of the foam | 2 | 3 | 5 |

* A = stannous octoate + 2,2,4-trimethyl-2-silamorpholine in a molar ratio of 1:1
B = stannous octoate + 1,3-bis-(diethylaminomethyl)tetramethyl disiloxane in a molar ratio 1:1

EXAMPLES 35 through 37

The components specified in table VII below are stirred intimately together and the resulting reaction mixture is poured into molds or delivered on to the conveyor belt of a foaming machine. Foams begin to form after the cream times indicated, developing into soft elastic foams after the rise and gel times indicated. In each instance, foams with outstanding physical properties and a high permeability to air are formed. Table VII below shows that when the catalysts according to the invention are used, different reaction times are obtained, depending upon the sila-amine components used

TABLE VII

|  | Examples | | |
|---|---|---|---|
|  | 35 | 36 | 37 |
| Partly branched polyalkylene glycol based on trimethylol propane and propylene oxide (average molecular weight 3000, OH NUMBER 56) | 100.0 | 100.0 | 100.0 |
| triethylene diamine | 0.10 | | 0.10 |
| Water-soluble organopolysiloxane polyalkylene glycolether | 1.10 | 1.10 | 1.10 |
| Water | 3.00 | 3.00 | 3.00 |
| Tolylene diisocyanate (80% 2,4- and 20% 2,6-isomer) | 40.90 | 40.90 | 40.90 |
| Compound C* | 0.10 | | |
| Compound D* | | 0.10 | |
| Stannous octoate | | | 0.10 |
| Cream time (sec.) | 9 | 6 | 10 |
| Rise time (sec.) | 134 | 122 | 180 |
| Gel time (sec.) | 39 | 43 | 40 |
| Air permeability | 2 | 2 | 2 |

* C = stannous octoate + 2,2,4-trimethyl-2-silamorpholine in a molar ratio of 1:0.5
D = stannous octoate + 1,3-bis-(diethylaminomethyl)-tetramethyl-disiloxane in a molar ratio of 1:0.5.

EXAMPLE 38

The following components were reacted under the conditions of examples 32 through 37:

One-hundred parts of partly branched polypropylene glycol terminally modified with ethylene oxide (average molecular weight 3,500 OH-number 46)

1.6 parts of water-soluble organopolysiloxane polyalkylene glycolether

Five parts of water

Sixty parts of tolylene diisocyanate (80 percent 2,4- and 20 percent 2,6-isomer)

0.21 part of compound E

[i.e. stannous octoate + 1,3-bis-(diethylaminomethyl)-tetramethyldisiloxane + 2,2,4-trimethyl-2-silamorpholine in a molar ratio of 20:2:1.]..

The resulting soft polyurethane foam has outstanding mechanical properties and a high permeability to air.

EXAMPLES 39 and 40

The components listed in table VIII below are stirred intimately together and the resulting reaction mixture is poured into molds or delivered onto the conveyor belt of a foaming machine. Foams begin to form after the initiation times indicated, developing into soft elastic foams after the rise and gel times specified. In each instance, foams with outstanding mechanical properties and a high permeability to air are formed.

TABLE VIII

|  | Examples | |
| --- | --- | --- |
|  | 39 | 40 |
| Weakly branched polyadipic acid glycol ester (average molecular weight 2,000, OH-number 60) | 100.0 | 100.0 |
| Water-soluble organopolysiloxane polyalkylene glycolether | 1.0 | 1.0 |
| Water | 5.0 | 5.0 |
| Dimethylbenzylamine | 1.3 | 1.3 |
| Tolylene diisocyanate (65% 2,4and 35% 2,6-isomer) | 65.0 | 65.0 |
| Compound F * | 0.3 | — |
| Stannous octoate | — | 0.3 |
| Rise time (sec.) | 24 | 30 |
| Gel time (sec.) | 4 | 6 |

* Compound F = stannous octoate + 2,24-trimethyl-2-silamorpholine in a molar ratio of 4.1

EXAMPLES 41 and 42

The following components were reacted under the conditions of examples 32 through 37:

TABLE IX

|  | Examples | |
| --- | --- | --- |
|  | 41 | 42 |
| Branched polypropylene glycol (average molecular weight 310, OH-number 550) | 100.0 | 100.0 |
| Water-soluble organopolysiloxane polyalkyleneglycolether | 1.0 | 1.0 |
| Trichlorofluoromethane | 40.0 | 40.0 |
| Stannous octoate | 0.3 | 0.3 |
| Compound F * | — | 0.3 |

| Crude diphenylmethane-4,4'-diisocyanate (prepared by condensing aniline-formaldehyde followed by phosgenation)[xx] | 131.0 | 131.0 |
| --- | --- | --- |
| Rise time (sec.) | 150 | 130 |
| Gel time (sec.) | 105 | 90 |

* Compound F = stannous octoate + 2,2,4-trimethyl-2-silamorpholine in a molar ratio of 4:1

XX — the component is a mixture of isocyanates having the formula

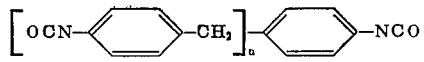

where $n$ has an average value of 1.88.

The rigid polyurethane foam thus obtained shows outstanding mechanical properties.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. In the preparation of polyurethane foams by reaction between an organic compound containing at least two active hydrogen containing groups as determined by the Zerewitinoff method and an organic polyisocyanate, the improvement which comprises catalyzing the reaction with a compound containing the grouping

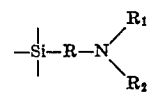

wherein $R_1$ and $R_2$ are the same or different alkyl, cycloalkyl, alkoxyalkyl, alkenyl or aralkyl radicals or are members of a common cycloaliphatic or heterocyclic structure when the silicon atom is part of a silane or disiloxane grouping; or $R_1$ has the above meaning and $R_2$ denotes an hydroxylalkyl or aminoalkyl group attached to the silicon atom through the oxygen or nitrogen atoms respectively in an alkoxysilyl or aminosilyl linkage.

2. The reaction of claim 1 wherein the catalyst is either an aminosilyl-N-heterocyclic compound or a monosiloxy-N-heterocyclic compound.

3. The reaction of claim 1 wherein the catalyst is an aminomethyl silane.

4. The reaction of claim 1 wherein the catalyst is an a,w-bis(dialkylaminomethyl) disiloxane.

5. The reaction of claim 1 wherein the catalyst has the structure

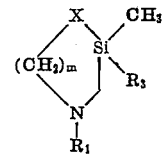

wherein X is NZ or O, Z is hydrogen or an alkyl radical having from about one to about 12 carbon atoms, $m$ is an integer of from 2 to 4 and $R_3$ is an alkoxy radical having from one to 12 carbon atoms, an alkyl radical having from one to four carbon atoms, or

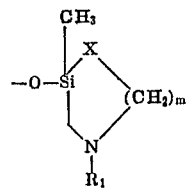

wherein X, $m$ and $R_1$ have the same meanings as above.

6. The reaction of claim 1 wherein the catalyst has the structure

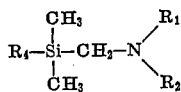

wherein R₄ is an alkoxy group having from one to 12 carbon atoms or a morpholine group.

7. The reaction of claim 1 wherein a member selected from the group consisting of a tertiary amine and an organometallic catalyst or mixtures thereof is included in the reaction mixture.

8. The reaction of claim 1 wherein water is used as a blowing agent in the preparation of a cellular polyurethane.

9. The reaction of claim 1 wherein said compound having the grouping

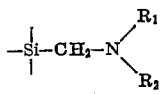

is premixed with an organic metallic compound.

10. The reaction of claim 1 wherein the catalyst has the structure

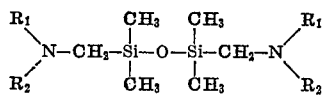

11. The method of preparing cellular polyurethanes which comprises reacting in the presence of a blowing agent an organic polyisocyanate with a compound containing at least two active hydrogen containing groups as determined by the Zerewitinoff method in the presence of a catalytic amount of the catalyst containing

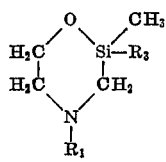

wherein R₁ and R₃ are alkyl radicals having one to four carbon atoms.

12. The method of claim 11 wherein the catalyst has the formula

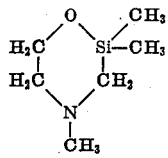

13. The method of claim 11 wherein the catalyst has the formula

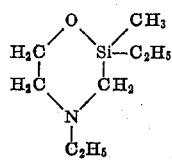

14. The method of claim 11 wherein the reaction mixture contains a stannous salt of a carboxylic acid having one to 18 carbon atoms.

15. The method of claim 14 wherein the stannous salt is stannous octoate or stannous oleate.

16. The method of claim 12 wherein the catalyst contains stannous octoate or stannous oleate.

17. The method of claim 13 wherein the catalyst contains stannous octoate or stannous oleate.

18. An activator for the reaction between isocyanates and compounds containing active hydrogen groups reactive with isocyanates which comprises a mixture of an organic metallic compound and a sila-amine having the grouping

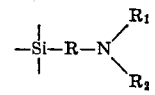

wherein R₁ and R₂ are the same or different alkyl, cycloalkyl, alkoxyalkyl, alkenyl or aralkyl radicals or are members of a common cycloaliphatic or heterocyclic structure when the silicon atom is part of a silane or lower polysiloxane grouping; or R₁ has the above meaning and R₂ denotes an hydroxylalkyl or aminoalkyl group attached to the silicon atom through the oxygen or nitrogen atoms respectively in an alkoxysilyl or aminosilyl linkage.

19. The activator of claim 18 which comprises a mixture of stannous octoate and 2,2,4-trimethyl-2-sila-morpholine.

* * * * *